Aug. 20, 1957     R. MEMPEL ET AL     2,803,507
RESILIENT SPACER RINGS FOR MULTIPLE BEARINGS
ROTATABLY SUPPORTING SHAFTS
Filed Dec. 3, 1952

RUDOLF MEMPEL,
HEINRICH SCHULTZ,
*INVENTORS*

BY

*PATENT AGENT*

United States Patent Office 2,803,507
Patented Aug. 20, 1957

2,803,507

RESILIENT SPACER RINGS FOR MULTIPLE BEARINGS ROTATABLY SUPPORTING SHAFTS

Rudolf Mempel, Berlin-Frohnau, and Heinrich Schultz, Berlin-Grunewald, Germany, assignors to Licentia Patent-Verwaltungs-G. m. b. H., Berlin-Grunewald, Germany Application December 3, 1952, Serial No. 323,818

5 Claims. (Cl. 308—184)

It has been known to provide resilient rings of metal in bearings supporting shafts at several places to decrease the dimensions of the gaps in these bearings and the degree of displacement or play of the shafts in the direction of their axes, whereby simultaneously mechanical oscillations or vibrations occurring in these machine parts are reduced.

By using such rings, it has not been possible to adapt the bearings to the prevailing load conditions, as said conditions widely differ from one another depending upon the kind of transmission means for the motion, and to obtain a sufficient dampening of the vibrations.

The object of the present invention is to provide resilient spacer rings in the gaps or annular spaces of multiple bearings, such as antifriction bearings, particularly for electric machines, said rings being adapted to reduce the dimensions of these gaps and decrease the longitudinal displacement and/or play of the shafts and simultaneously dampen mechanical oscillations or vibrations in the bearings and shafts. These resilient rings compensate for the tolerances and/or wear and tear of the bearing members and shaft, as the rings are elastically filling the spaces or gaps provided in said bearings.

It is a further and important object of this invention to provide rings made of resilient or elastic materials as spacer means in the bearings, whereby the disadvantages of the known metal spacer rings are avoided. Preferably non-metallic or plastic, natural or synthetic substances are used as structural materials for these spacer rings. The compensating spacer rings may be made of any kind of natural or synthetic rubber and of various types and/or mixtures of natural or synthetic resins or like materials. Good results were obtained with the synthetic rubber compound known under the name Buna and with silicon rubber.

It is another object of the invention to insert in the bearings elastic or resilient, plastic spacer rings of cross sections having shapes which are designed in accordance with the particular application of the bearings, i. e. in accordance with the kind of machines in which these bearings are used or the load conditions under which the shafts rotatably mounted in the bearing operate.

It is a further object of the invention to provide ring-shaped retaining means for holding the resilient or elastic rings in place and fix the extent of deformation of these resilient or elastic rings, when the latter are compressed as a result of longitudinal displacements of the shafts and the bearing members in one direction, said retaining means having flanges extending longitudinally and serving as abutment for the inner side surfaces of the bearing to limit the longitudinal displacements of the shafts to a predetermined valve.

By using the deformable or plastic material of the mentioned kinds for the elastic or resilient spacer rings a considerable dampening action is obtained. In addition to this, it will be possible to obtain dampening characteristics required for the desired effect in individual cases by using suitable shapes for the cross sections of the elastic rings or by providing the mentioned special metal retainers for the plastic rings and/or by suitably shaping the chambers or seating surfaces for the spacer rings in the bearings.

These and other important objects and advantageous features of the present invention will be apparent from the following detailed description and drawing appended hereto, wherein merely for the purposes of disclosure, non-limitative embodiments of the invention are set forth.

Figure 1:
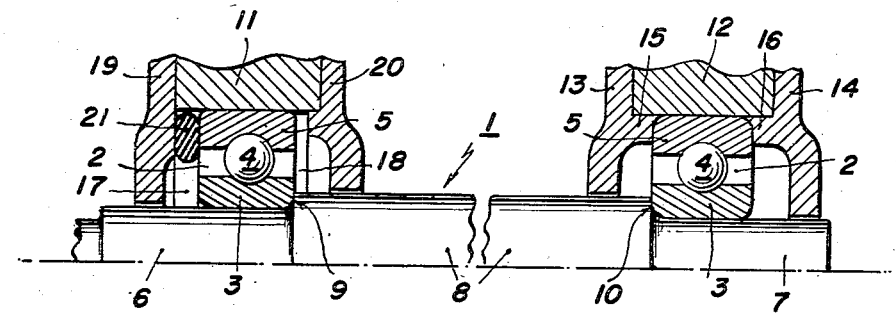
Fig. 1 illustrates diagrammatically a longitudinal section through the upper halves of a two-bearing assemblage representing a first embodiment of the present invention.

Referring to the drawing in detail, and first to Fig. 1, thereof, a shaft 1, for example, of an electric machine (not shown) is rotatably mounted in two antifriction or ball bearings 2 which are spaced from one another, a certain distance. Each of these ball bearings 2 comprises an inner race-ring 3, a number of balls 4 and an outer race-ring 5, these race-rings 3 and 5 having grooves respectively facing one another and providing internal raceways for the balls 4 riding therein. The inner race-rings 3 are mounted on parts 6 and 7 of the shaft 1, said parts having somewhat smaller diameters than the main part 8 of shaft 1. Annular shoulders 9 and 10 respectively engaged by the adjacent front surfaces of the inner race-rings 3 of the ball bearing 2 are obtained at the intersections of the main part 8 of shaft 1 with the shaft parts 6 and 7 of reduced diameters. The outer race-rings 5 are respectively mounted in the bearing frames 11 and 12. While the bearing frame 12 on the right side has the flange members 13 and 14 holding firmly and without providing gaps, the upper race-ring 5 therebetween by means of annular extensions 15 and 16, projecting toward one another from the flange members 13 and 14, respectively, in the longitudinal direction to prevent longitudinal displacements of the right ball bearing 2, the left ball bearing 2 can be laterally displaced in ring-shaped gaps or spaces 17 and 18, respectively provided between the two front ends of this left ball bearing 2 and flange members 19 and 20 of the bearings frame 11. The left gap or space 17 is partially filled with a resilient or elastic, plastic ring 21 inserted therein and engaging the inner circumference in the opening of the bearing frame 11, the inner wall of the flange 19 and the left front end of outer race-ring 5. This plastic ring 21, for example, made of Buna or silicon rubber had originally a circular cross section which was deformed to an oval shape, shown in the drawing, by the compressional forces exerted thereon. The resiliency of the ring 21 permits slightly longitudinal displacements of the left ball bearing 2, whereby the ring 21 will maintain contact with the surfaces between which it is squeezed. Thus, a certain amount of longitudinal play of the shaft 1 is permitted, when this shaft 1 will be displaced longitudinally together with the left ball bearing 2 overcoming the elastic or resilient forces of the plastic ring 21, which dampens such longitudinal movements. The axial thrust toward the right side is taken up by the annular extension 16 of flange 14, as said extension is engaged by the outer race-ring 5 of the right ball bearing 2 which, in turn, is firmly secured to part 7 of shaft 1 via the inner race-ring 3 engaging shaft shoulder 10. The axial thrust toward the left side is entirely taken up by the resilient and compressible ring 21 engaged by the left front end of outer race 5 of left ball bearing 2 which, in turn, is mounted on shaft part 6 via the inner race-ring 3 engaging shaft shoulder 9.

Figure 2:
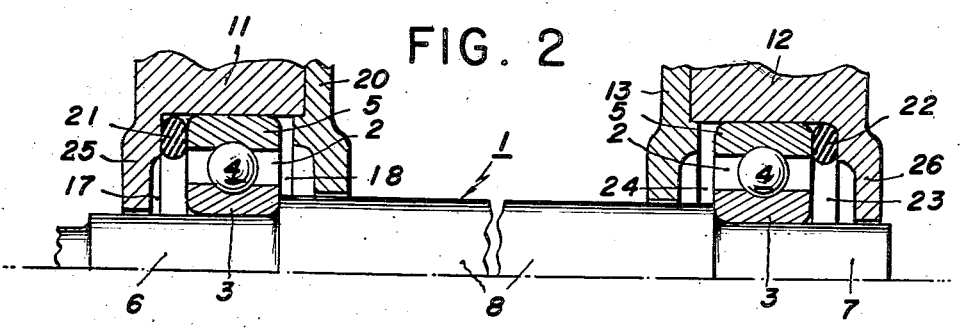
Figure 2 shows a modification of the embodiment of Fig. 1, illustrated in the same manner as in Fig. 1.

In the modification of the invention shown in Fig. 2, the same reference characters are used for the same parts as in Fig. 1. In contrast to Fig. 1 in which only a single resilient ring 21 is provided on one side, elastically taking up thrust forces toward the left, a second resilient ring 22 of the same cross section as the ring 21 is employed on the right side in the embodiment of Fig. 2. The ring 22 is inserted in an annular space or gap 23 provided adjacent the right front end of the right ball bearing 2, whereby this ring 2 fills the space 23 in a similar manner as the ring 21 fills the space 17. An empty annular space or gap 24 is provided adjacent the left front end of the right ball bearing 2, so that the right and left sides of the bearing assemblage are symmetrical. In contrast to the embodiment in Fig. 1, the outer bearing flanges 25 and 26 of the modification of Fig. 2 are integrally joined to the bearing frames 11' and 12', respectively. As a result of the provision of two elastic or resilient rings 21 and 22 which are respectively compressed when the axial thrust forces are acting on the shaft 21 in the one or the other direction, oscillations or vibrations are reduced to a greater extent due to the dampening qualities of these compressible rings. At the same time, the axial play or displacement of the shaft 1 can be controlled and limited by suitably dimensioning the rings 21 and 22.

Figures 3, 4, 5:
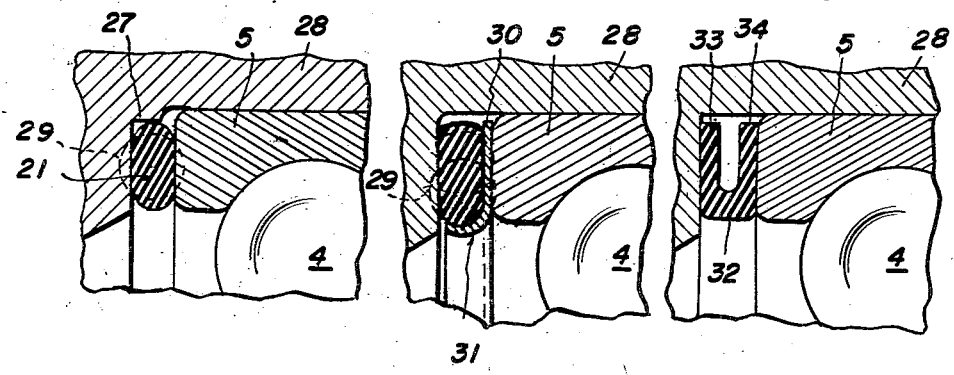
Figs. 3, 4 and 5 are longitudinal sections through parts of the upper halves of further embodiments of the present invention.

The embodiments of this invention, shown in Figs. 3, 4 and 5 are designed for machines in which substantial forces in longitudinal direction or axial thrusts occur. The same reference numbers are used in these Figures for the same parts as in Figs. 1 and 2.

In Fig. 3, an annular shoulder 27 is provided in the opening of bearing frame 28 limiting the displacement of the outer race-ring 5 to the left side, said shoulder 27 circumferentially engaging the resilient or elastic spacer ring 21 inserted between the inner front wall of the bearing frame 28 and the left front end of the outer race-ring 5. The original circular cross section of the deformable ring 21 is indicated by the dotted circle 29. While axial thrust forces directed to the left are normally taken up by the compressible ring 21, as described with reference to the foregoing embodiments, greater forces acting in the same direction will displace the outer race-ring 5 so that the latter will engage the shoulder 27, forming an abutment for this outer race-ring 5.

According to Fig. 4, a relatively thin, ring-shaped element 30 having a slightly smaller diameter than the outer diameter of the resilient or elastic ring 21 and an inner protruding portion or flange 31 is inserted between the left front end of the outer race-ring 5 and this ring 21, whereby said flange 31 partially surrounds the inner edge of the ring 21. No shoulder 27 as in Fig. 3 is provided in the embodiment of Fig. 4. When axial forces displace the outer race-ring 5 to the left, the resilient or elastic ring 21 is compressed and/or deformed in a similar manner as in the foregoing embodiment. As the elastic ring 21 engages the flange 31, said elastic ring cannot be deformed in radial direction. If these axial forces exceed a certain valve, the outer rim of flange 31 will engage the inner left wall of the frame 28 of the bearing and thereby limit the extent of displacement of the ball bearing and shaft as in the embodiment of Fig. 3.

In the embodiment of this invention, shown in Fig. 5, a limitation of the displacement in axial direction is obtained by the particular shape of a resilient or elastic ring 32 inserted as in Fig. 5 between the inner front wall of the bearing frame 28 and the left front end of the outer race-ring 5. This resilient or compressible ring has the shape of the letter U, the legs 33 and 34 of which are radially directed, while the outer side walls of the two legs are respectively engaging the seat surfaces of the inner front wall of frame 28 and of the left front end of the outer race-ring 5. When axial thrust forces are acting toward the left, the ring 32 will be compressed and deformed, whereby the space or gap between the legs 33 and 34 may be narrowed or closed. Resilient or elastic rings of other dimensions, forms and cross sections may be used to obtain the same or similar effects or characteristics.

The invention may be applied to assemblages of antifriction bearings other than ball bearings, for example, to roller bearing assemblages. It is possible to provide the resilient and elastic ring according to the invention on both sides of the antifriction bearings.

While several specific embodiments of the present invention have been shown and described in the foregoing, it is to be understood that the invention is not to be intended to be limited thereto, as various modifications and changes can be made in this invention without departing from the spirit and scope thereof as set forth in the appended claims.

We claim:

1. In an assembly of anti-friction bearings rotatably supportnig a shaft, two stationary frame members, an antifriction bearing in each of said frame members, comprising an inner race secured to said shaft, an outer race mounted in the respective frame members, said races having grooves respectively facing one another and providing an internal raceway, a plurality of rolling means riding in said raceway, means on the sides of each of said frame members to hold said outer races in said frame members, a resilient spacer ring of deformable, elastic, non-metallic material in at least one of said frame members partially filling the cross section of an annular gap left therein between one front end of one of said outer races and the opposite holding means of the respective frame member and engaging said one front end and said opposite holding means, said spacer ring having a different cross section than that of said gap, the material of said spacer ring permitting an elastic deformation of the cross section of said spacer ring under the action of forces exerted on said shaft in longitudinal direction, an abutment means in said gap said abutment means being independent of said spacer ring and being adapted to limit the displacement of said outer race in longitudinal direction when said forces overcome the resistance of compression and deformation of said spacer ring.

2. In an assembly of antifriction bearings according to claim 1, wherein as abutment means an annular shoulder is provided on the inner wall of the frame member housing said resilient spacer ring, said shoulder extending in said gap partially filled by said spacer ring and providing a stop for the opposite front end of said outer race, when the latter is displaced in longitudinal direction by a predetermined force overcoming the resistance of compression and deformation of said ring.

3. In an assembly of antifriction bearings according to claim 1, wherein said abutment means is a retaining ring of solid material inserted between said resilient spacer ring and the adjacent front end of said outer race, said retaining ring having an annular flange portion extending in longitudinal direction and partly surrounding said spacer ring, the free edge of said flange portion providing a stop for said opposite holding means of said frame member, when said outer race is displaced in longitudinal direction by a predetermined force overcoming the resistance of compression and deformation of said spacer ring.

4. In an assembly of antifriction bearings according to claim 3, said flange portion partially surrounding the inner side of said spacer ring.

5. In an assembly of antifriction bearings rotatably supporting a shaft, two stationary frame members, an antifriction bearing in each of said frame members, each of said bearings comprising an inner race secured to said shaft, an outer race mounted in the respective frame member, said races having grooves respectively facing one another and providing an internal raceway, a plurality of rolling means riding in said raceway, annular abutment means on the sides of each of said frame member to hold said outer races therein with an annular gap left between one front end of at least one of said outer races and the opposite annular abutment means, a resilient spacer ring lodged in said gap, said spacer ring being made of deformable elastic material, having a different cross section than that of said gap and engaging said one front end and said opposite annular abutment means and partially filling the cross section of said gap, said spacer ring material permitting an elastic deformation of the cross section of said spacer ring under the action of forces exerted on said shaft in longitudinal direction, an inflexible ring inserted between said spacer ring and said one front end of said outer race, said inflexible ring having an inner flange portion extending in longitudinal direction of said shaft and partially surrounding said spacer ring for which it forms a seat, the free edge of said inner flange portion providing an abutment for the opposite annular abutment means on said frame member, when said outer race is displaced in longitudinal direction by a predetermined force overcoming the resistance of compression and deformation of said ring.

References Cited in the file of this patent

UNITED STATES PATENTS

| | | |
|---|---|---|
| 1,102,547 | Rockwell | July 7, 1914 |
| 1,156,188 | Sorensen | Oct. 12, 1915 |
| 1,930,098 | Hossfeld | Oct. 10, 1933 |
| 2,015,784 | Brown | Oct. 1, 1935 |
| 2,357,597 | Martinec | Sept. 5, 1944 |
| 2,543,647 | Stark | Feb. 27, 1951 |